United States Patent
Coffin et al.

(10) Patent No.: US 9,605,560 B2
(45) Date of Patent: Mar. 28, 2017

(54) FAN SHAFT RETENTION

(75) Inventors: James B. Coffin, Windsor, CT (US); Kevin G. VanDuyn, Bloomfield, CT (US)

(73) Assignee: United Technolgies Corporation, Farmington, CT (US)

( * ) Notice: Subject to any disclaimer, the term of this patent is extended or adjusted under 35 U.S.C. 154(b) by 2996 days.

(21) Appl. No.: 11/938,963

(22) Filed: Nov. 13, 2007

(65) Prior Publication Data

US 2009/0123271 A1    May 14, 2009

(51) Int. Cl.
| | | |
|---|---|---|
| F01D 25/16 | (2006.01) |
| F16C 19/38 | (2006.01) |
| F16C 19/54 | (2006.01) |
| F16C 25/08 | (2006.01) |
| F16C 19/36 | (2006.01) |

(52) U.S. Cl.
CPC ............ *F01D 25/16* (2013.01); *F16C 19/364* (2013.01); *F16C 19/548* (2013.01); *F16C 25/083* (2013.01); *F16C 2360/23* (2013.01)

(58) Field of Classification Search
CPC ...... F01D 25/162; F01D 25/164; F16C 19/28; F16C 19/38; F16C 19/547; F16C 25/083
USPC ........................................ 415/104, 107, 229
See application file for complete search history.

(56) References Cited

U.S. PATENT DOCUMENTS

| | | | | |
|---|---|---|---|---|
| 2,801,881 | A * | 8/1957 | Campbell | 239/464 |
| 3,792,586 | A | 2/1974 | Kasmarik et al. | |
| 3,909,085 | A | 9/1975 | Wilkinson et al. | |
| 4,116,506 | A | 9/1978 | Moritomo et al. | |
| 4,598,600 | A | 7/1986 | Knowles | |
| 5,316,393 | A | 5/1994 | Daugherty | |
| 5,836,739 | A | 11/1998 | Haramura et al. | |
| 6,082,959 | A * | 7/2000 | Van Duyn | 415/9 |
| 6,312,215 | B1 | 11/2001 | Walker | |
| 6,331,078 | B1 | 12/2001 | Van Duyn | |
| 6,349,683 | B1 * | 2/2002 | Annen et al. | 123/46 E |
| 6,428,269 | B1 | 8/2002 | Boratgis et al. | |
| 6,447,248 | B1 | 9/2002 | Kastl et al. | |
| 6,464,401 | B1 * | 10/2002 | Allard | 384/571 |
| 6,491,497 | B1 | 12/2002 | Allmon et al. | |
| 7,014,026 | B2 * | 3/2006 | Drussel et al. | 192/105 B |
| 7,153,091 | B2 | 12/2006 | Stephenson et al. | |
| 2007/0084189 | A1 | 4/2007 | Moniz et al. | |

OTHER PUBLICATIONS

Extended European Search Report dated Mar. 9, 2009.

* cited by examiner

*Primary Examiner* — Sean J Younger
(74) *Attorney, Agent, or Firm* — Carlson, Gaskey & Olds, PC

(57) ABSTRACT

A retention system for a fan in a gas turbine engine includes a shaft that is rotatable relative to a bearing support structure about an axis. The retention system includes fore and aft bearings that rotatably support the shaft, with the fore and aft bearings being spaced apart from each other in a direction along the axis. A machined spring reacts between the bearing support structure and the fore bearing to provide a desired axial preload.

31 Claims, 2 Drawing Sheets

FAN SHAFT RETENTION

BACKGROUND OF THE INVENTION

This disclosure relates to a method and apparatus for supporting and retaining a fan shaft in a gas turbine engine.

A gas turbine engine includes a fan section with a fan shaft that is mounted on bearings to rotate fan blades. The fan shaft is rotatable about an axis and the bearings include a fore bearing and an aft bearing that is spaced rearwardly from the fore bearing along the axis. A bearing support structure supports outer races of the fore and aft bearings, while respective inner races are supported on the fan shaft. A bearing spacer is fixed to the fan shaft and is positioned between inner races of the fore and aft bearings.

To adequately support the fan shaft, an axial preload in excess of a highest predicted windmill reaction load should be provided to prevent skidding of a main thrust bearing. Skidding can occur when a high reverse load is applied during a windmilling operation on-wing, or when windmilling while an aircraft is parked on the ground. Windmilling refers to a condition where the gas turbine engine is in an unpowered mode, i.e. is not supplied with fuel, and ambient air is drawn or driven into the gas turbine engine causing the fan blades to rotate at a relatively low rotational frequency.

A support and retention system for the fan shaft and bearings should allow windmill operation in excess of normal windmill loads without unloading the main thrust bearing such that the bearing would skid. Excessive windmill loads could occur during fan blade-out or a high "g" load maneuver, for example.

Further, in addition to accommodating windmilling conditions, the support and retention system for the fan shaft and bearings should maintain a nearly constant preload over a full range of static and dynamic loading, as well as for all thermal conditions.

One known support and retention system utilizes a plurality of coil springs to provide the axial preload. The coil springs are mounted directly to the bearing support structure using various mounting hardware. As many as twenty-four different coil springs can be required to provide sufficient axial preload. This requires a significant amount of mounting hardware, which is subject to wear and can adversely affect the overall fatigue life of the system. Also, the significant number of parts is disadvantageous from a maintenance cost and labor perspective.

Another disadvantage with the current support and retention system is that the arrangement of the series of coil springs and associated stacked components provides manufacturing tolerance challenges. Accordingly, there is a need to provide a support and retention system that can accurately set a bearing preload without requiring excessive manufacturing tolerances, as well as addressing the other shortcomings discussed above.

SUMMARY OF THE INVENTION

An example retention system for a fan in a gas turbine engine includes a shaft that is rotatable relative to a bearing support structure about an axis. The retention system includes fore and aft bearings that rotatably support the shaft, with the fore and aft bearings being spaced apart from each other in a direction along the axis. A machined spring reacts between the bearing support structure and the fore bearing to provide a desired axial preload.

In one example, the machined spring comprises a single spring element. The single spring element reacts between an outer race of the fore bearing and an inwardly extending shoulder of the bearing support structure.

In one example, the bearing support structure includes a first inwardly extending shoulder and a second inwardly extending shoulder that is spaced axially from the first inwardly extending shoulder in an aft direction along the axis. The machined spring includes a fore spring end that is associated with the outer race of the fore bearing and an aft spring end that is associated with the second inwardly extending shoulder.

In one example, an outer race of the aft bearing is attached to the bearing structure at an attachment interface. The attachment interface is aft of the second inwardly extending shoulder. An inner race of the aft bearing abuts against an outwardly extending shoulder of the shaft.

In one example, a bearing spacer is fixed to the shaft and abuts against inner races of the fore and aft bearings. A nut is installed on the shaft and is associated with the inner race of the fore bearing to exert a load that reacts back through the inner race of the aft bearing against the outwardly extending shoulder of the shaft.

In one example, a fore shim is installed between the first inwardly extending shoulder of the bearing support structure and the fore spring end at the outer race of the fore bearing. An aft shim is installed between the second inwardly extending shoulder and the aft spring end.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
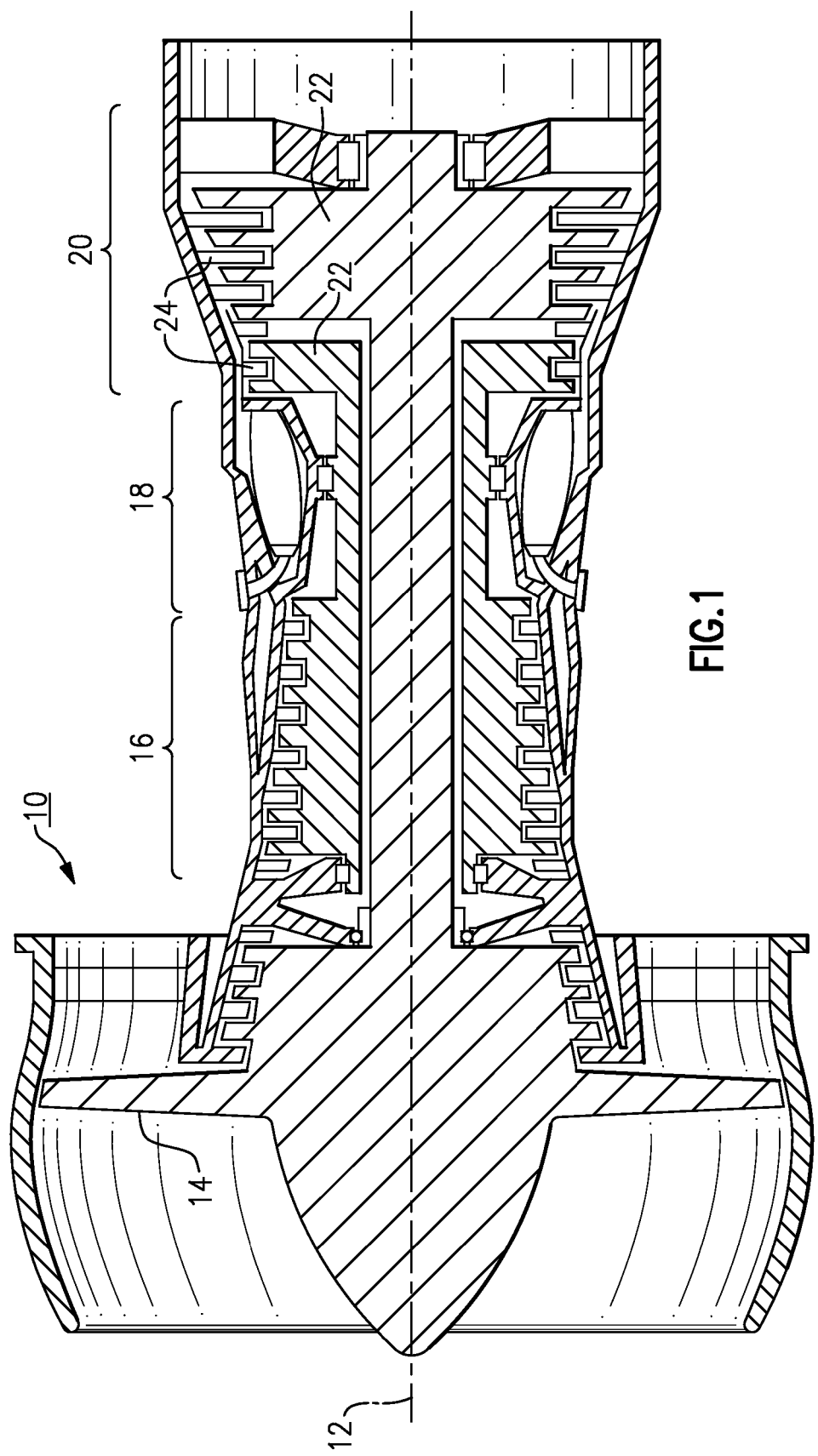
FIG. 1 is a highly schematic view of a cross-section of a gas turbine engine.

FIG. 1 illustrates selected portions of an example turbine engine 10, such as a gas turbine engine 10 used for propulsion. In this example, the turbine engine 10 is circumferentially disposed about an engine centerline 12. The turbine engine 10 includes a fan 14, a compressor section 16, a combustion section 18, and a turbine section 20. The combustion section 18 and the turbine section 20 include corresponding blades 22 and vanes 24. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown. For example, a gas turbine engine may contain a gearbox disposed between the turbine section 20 and the fan 14, allowing the fan 14 to turn at a different speed than the turbine.

Figure 2:
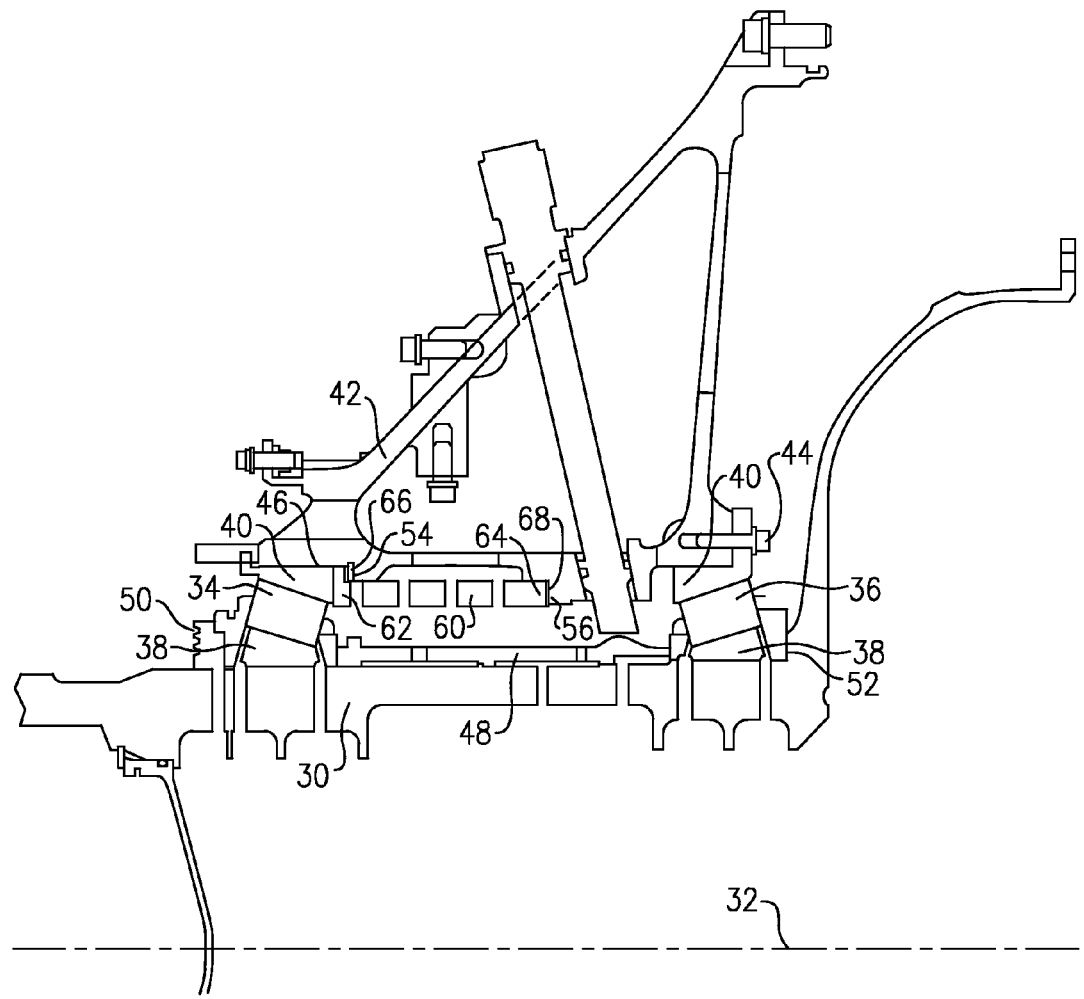
FIG. 2 is a schematic view of a partial cross-section of a shaft, bearing assembly, and shaft retention system of the gas turbine engine of FIG. 1.

FIG. 2 illustrates an example of a section of a fan drive and retention system, which includes a fan shaft 30 that is rotatable about an axis 32 that coincides with the engine centerline 12 of the gas turbine engine 10. It should be understood that only the upper cross-section of the fan shaft 30 relative to the axis 32 is shown in FIG. 2, with the lower cross-section being similarly configured to that of the upper cross-section as the fan shaft 30 comprises a component that extends about the axis 32.

The fan shaft 30 is rotatably supported by a fore bearing 34 and an aft bearing 36. In the example shown, the fore 34 and aft 36 bearings are tapered roller bearings, however, other types of bearings could also be used. The fore 34 and aft 36 bearings are axially spaced apart from each other along the axis 32. Inner races 38 of the fore 34 and aft 36 bearings are clamped on the fan shaft 30 and outer races 40 are mounted to a bearing support structure 42. The outer race 40 of the aft bearing 36 is bolted to the bearing support structure 42 at an attachment interface that includes at least one fastener 44. The bearing support structure 42 is bolted to a non-rotational frame of an engine case of the gas turbine engine 10. The outer race 40 of the fore bearing 34 is constrained radially and tangentially, while free to move axially within a bore 46 of the bearing support structure 42. The outer race 40 of the aft bearing 36 is fixed to the bearing support structure 42 at the attachment interface, which reacts back through the engine case to a pylon. A bearing spacer 48 is also clamped to the fan shaft 30 and is positioned between the inner races 38 of the fore 34 and aft 36 bearings.

A nut 50 applies the clamping force which reacts through the inner race 38 of the fore bearing 34, through the bearing spacer 48, through the inner race 38 of the aft bearing 36, and against a shoulder 52 of the fan shaft 30. The shoulder 52 extends outwardly from the fan shaft 30 in a direction away from the axis 32.

The bearing support structure 42 includes a fore shoulder 54 and an aft shoulder 56. The fore 54 and aft 56 shoulders extend inwardly toward the axis 32 and are positioned axially between the fore 34 and aft 36 bearings.

A resilient member reacts between the fore bearing 34 and the bearing support structure 42 to set an axial preload for the retention system. The resilient member comprises a single spring element that is a machined spring 60. Machined springs offer many advantages over other types of springs. Machined springs are made from bar stock material that is machined into a thick-walled tube form. In one example, ASM 4340 tool steel is used as a spring material, however other materials could also be used. Once the tube is formed, a series of helical or circumferential slots is then cut to provide multiple beam elements or flexures that are deflectable to provide a desired spring stiffness. Spring stiffness for machined springs are much more accurately controlled and thus, preloads can be more accurately set than with other types of springs.

The flexure of the machined spring 60, i.e. the section providing the desired elasticity, is captive between fore 62 and aft 64 end sections of the machined spring 60, which provide structure and attachment. The end sections have infinite stiffness when compared to the flexure which is advantageous when compared to other spring types. Further, machined springs 60 can be made to more precise dimensions than wire springs, for example.

The machined spring 60 can easily provide the desired axial preload to accommodate windmill reaction loads. As discussed above, the fan shaft 30 is mounted to the fore 34 and aft 36 bearings via inner races 38 of the bearings. The inner races 38 of the fore 34 and aft 36 bearings are located by the bearing spacer 48. The outer race 40 of the fore bearing 34 can slide axially in the bore 46 of the bearing support structure 42, while the outer race 40 of the aft bearing 36 is fastened to the bearing support structure 42.

The fore 34 and aft 36 bearings are thus retained by the bearing support structure 42, which reacts loads back through the engine case to the pylon. An axial preload in excess of the highest predicted windmill reaction load is provided by the machined spring 60 to prevent skidding of a main thrust bearing when a load reverses during an in-flight windmill operation on-wing, or when windmilling while an aircraft is parked.

A fore shim 66 is positioned between the fore shoulder 54 of the bearing support structure 42 and the fore spring end 62 of the machined spring 60, which is abutting against the outer race 40 of the fore bearing 34. An aft shim 68 is positioned between the aft shoulder 56 and the aft spring end 64. The fore shim 66 comprises a windmill limit stop shim. The fore shoulder 54, which is just behind the fore shim 66, allows windmill operation in excess of normal windmill loads, such as during fan blade-out or high "g" load maneuvers, without unloading the main thrust bearing to the point where the bearing skids.

The fore 66 and aft 68 shims are ground shims that allow the spring preload and windmill gaps to be accurately set without requiring restrictive manufacturing tolerances of the primary stacked components.

The use of a machined spring 60 also provides for a pair of closed loop assembly load paths. A first assembly load path for the retention system starts from the inner race 38 of the fore bearing 34 and goes to the bearing spacer 48, then to the inner race 38 of the aft bearing 36, then to the shaft shoulder 52, and back through the fan shaft 30 to the nut 50. A second assembly load path starts from the outer race 40 of the fore bearing 34 and goes to the machined spring 60, then to the aft shim 68, then to the bearing support structure 42 via the attachment interface at the outer race 40 of the aft bearing 36, and then back through the inner race 38 of the aft bearing 36, then to the bearing spacer 48, and then to the inner race 38 of the fore bearing 34.

In the arrangement described, there are also three open thrust load paths for transmitting axial thrust from the fan 14 out through bearing support structure 42 to the engine case and pylon. Under normal, powered operation, the fan 14 generates a forward thrust load that is transmitted from the fan shaft 30 through the aft bearing 36 to the bearing support structure 42, and out to the engine case. During a windmill event, an aft thrust load from the fan shaft 30 is taken up by the fore bearing 34. This aft thrust load is at first transmitted through the machined spring 60 to the aft shim 68, then to the aft shoulder 56, and then to the bearing support structure 42. Finally, when operated at an axial load in excess of a maximum predicted windmill load, the machined spring 60 compresses to the extent that the gap between the fore spring end 62 and the fore shim 66 closes, preventing the machined spring 60 from additional deflection. This allows an excess thrust load to be shunted thru the fore shoulder 54, which splits the thrust load between both the fore 54 and aft 56 shoulders. This shunting of the excess thrust load prevents gross separating movement and skidding of the aft bearing 36, and also prevents the machined spring 60 from damage due to yielding from excessive deflection.

By using a single machined spring 60 to maintain bearing preload, part count and assembly is significantly reduced when compared to prior complex, multi-coil spring configurations. The machined spring 60 can also be held to a much tighter stiffness tolerance than coil springs allow, so bearing preload can be set with much greater accuracy and precision. The machined spring 60, along with the use of the fore 66 and aft 68 shims, allows other major fan components to be designed with acceptable manufacturing tolerances.

Further, the machined spring 60 provides the assembly load paths described above, as well as providing a reduced foreign object damage (FOD) threat when compared to a coil spring design, should the machined spring fail. This is because a break through one of the flexures of the machined spring 60 does not result in two separate spring pieces, which is the result when a coil spring fails.

Finally, another advantage with using a single machined spring 60 is a positive impact on the overall packaging space within the bearing support structure 42. The use of a single machined spring 60 requires less packaging space than prior multi-coil spring designs, thus a distance between an inner surface of the bearing support structure 42 and an outer surface of the fan shaft 30 can be reduced.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A retention system for a fan comprising:
   a bearing support structure;
   a shaft rotatable relative to said bearing support structure about an axis;
   a fore bearing rotatably supporting said shaft;
   an aft bearing rotatably supporting said shaft, said aft bearing being axially spaced from said fore bearing along said axis; and
   a machined spring reacting between said bearing support structure and said fore bearing to set a desired axial preload.

2. The retention system according to claim 1 wherein said machined spring comprises a single spring element.

3. The retention system according to claim 1 wherein said bearing support structure is securable to an engine case and including a bearing spacer fixed to said shaft and abutting against inner races of said fore and said aft bearings, and wherein an outer race of said fore bearing abuts against a shoulder of said bearing support structure and an outer race of said aft bearing is fixed to said bearing support structure with at least one fastener to react loads back through the engine case to a pylon.

4. The retention system according to claim 1 wherein said machined spring has a first spring end that is associated with an outer race of said fore bearing and a second spring end that is associated with a shoulder of said bearing support structure.

5. The retention system according to claim 4 including a shim positioned between said second spring end and said shoulder.

6. The retention system according to claim 1 including a windmill limit stop shim that is associated with a shoulder of said bearing support structure and a fore end of said machined spring.

7. The retention system according to claim 1 wherein said bearing support structure includes a fore shoulder and an aft shoulder that each extend inwardly toward said axis, and wherein said fore bearing includes an outer race associated with said fore shoulder and an inner race supported directly on said shaft, and said aft bearing includes an outer race that is fixed to said bearing support structure at an attachment interface and an inner race that is supported directly on said shaft, and including a bearing spacer that is fixed to said shaft and directly abuts said inner races of said fore and said aft bearings.

8. The retention system according to claim 7 wherein said machined spring comprises a single spring element that has an aft spring end associated with said aft shoulder and a fore spring end associated with said fore shoulder and said outer race of said fore bearing.

9. The retention system according to claim 8 including an aft shim positioned between said aft shoulder and said aft spring end, and including a fore shim positioned between said fore shoulder and said fore spring end.

10. The retention system according to claim 9 wherein said shaft includes a shaft shoulder that is positioned axially aft of said aft bearing in a direction along said axis, and including a nut that is secured to said shaft at said fore bearing, and providing:
    a first assembly load path that starts from said inner race of said fore bearing, transitions to said spacer, then to said inner race of said aft bearing, then to said shaft shoulder, and transitions back through said shaft to said nut; and
    a second assembly load path that starts from said outer race of said fore bearing, transitions to said machined spring, then to said aft shim, then to said bearing support structure via said attachment interface at said outer race of said aft bearing, and then transitions back through said inner race of said aft bearing, then to said spacer, and then to said inner race of said fore bearing.

11. The retention system according to claim 10 including:
    a first thrust load path for standard operating conditions that transmits axial thrust generated by a fan to said shaft, and then through said aft bearing to said bearing support structure and out to an engine case;
    a second thrust load path activated in response to a windmill event, said second thrust load path comprising an aft load from said shaft that is taken up by said fore bearing and is then transmitted through said machined spring to said aft shim, then to said aft shoulder, and then to said bearing support structure; and
    a third thrust load path activated in response to an axial load that is in excess of a maximum predicted windmill load, which causes said machined spring to compress such that a gap between said fore and said aft spring ends closes to prevent additional deflection of said machined spring and allows an excess thrust load to be shunted thru said fore shoulder, which splits said excess thrust load between both said fore and said aft shoulders.

12. The retention system according to claim 1 wherein said shaft comprises a fan shaft driven by a low pressure turbine and wherein inner races of said fore and aft bearings are directly mounted on said fan shaft.

13. The retention system according to claim 1 wherein said fore bearing comprises a single fore bearing and the aft bearing comprising a single aft bearing.

14. The retention system according to claim 13 wherein said single fore bearing and said single aft bearing comprise tapered roller bearings.

15. The retention system according to claim 1 wherein the machined spring comprises a thick-walled tube having a plurality of cut slots spaced axially from each other to provide multiple beam elements that are deflectable to provide a desired spring stiffness.

16. The retention system according to claim 1 wherein said machined spring includes a fore spring end and an aft spring end, said fore spring end directly abutting against an outer race of said fore bearing.

17. The retention system according to claim 16 wherein said bearing support structure includes a fore shoulder and an aft shoulder, and including a first shim positioned directly between said fore shoulder and said fore spring end and a second shim positioned directly between said aft shoulder and said aft spring end.

18. A gas turbine engine comprising:
  a compressor;
  a combustor;
  a turbine section; and
  a fan including:
    a bearing support structure;
    a shaft rotatable relative to said bearing support structure about an axis;
    a fore bearing rotatably supporting said shaft, said fore bearing including an outer race slidably received within said bearing support structure and an inner race that is directly supported on said shaft;
    an aft bearing rotatably supporting said shaft, said aft bearing being axially spaced from said fore bearing along said axis, and said aft bearing including an outer race fixed to said bearing support structure at an attachment interface and an inner race that is directly supported on said shaft;
    a bearing spacer fixed to said shaft and abutting against said inner races of said fore and said aft bearings; and
    a single spring element having an aft spring end associated with said bearing support structure and a fore spring end associated with said outer race of said fore bearing to provide a desired axial preload.

19. The gas turbine engine according to claim 18 wherein said single spring element comprises a machined spring.

20. The gas turbine engine according to claim 19 including a nut associated with said fore bearing, a fore shim positioned between said outer race of said fore bearing and a first inwardly extending shoulder of said bearing support structure, and an aft shim positioned between a second inwardly extending shoulder of said bearing structure and said aft spring end.

21. The gas turbine engine according to claim 20 wherein said fore and said aft bearings are tapered roller bearings.

22. The gas turbine engine according to claim 19 wherein said machined spring comprises a thick-walled tube having a plurality of cut slots spaced axially from each other to provide multiple beam elements that are deflectable to provide a desired spring stiffness.

23. The gas turbine engine according to claim 18 wherein said shaft comprises a fan shaft driven by a low pressure turbine of said turbine section and wherein said inner races of said fore and aft bearings are directly mounted on said fan shaft.

24. The gas turbine engine according to claim 18 wherein said fore bearing comprises a single fore bearing and the aft bearing comprising a single aft bearing.

25. The gas turbine engine according to claim 24 wherein said single fore bearing and said single aft bearing comprise tapered roller bearings.

26. A method for setting an axial preload in a bearing and shaft assembly for a fan in a gas turbine engine comprising the steps of:
  (a) providing a shaft that is rotatable about an axis relative to a bearing support structure;
  (b) rotatably supporting the shaft with a fore bearing;
  (c) rotatably supporting the shaft with an aft bearing that is axially spaced from the fore bearing along the axis, the aft bearing abutting against an outwardly extending shoulder of the shaft;
  (d) fixing a bearing spacer to the shaft to abut against inner races of the fore and aft bearings;
  (e) installing a nut on the shaft to abut against the inner race of the fore bearing; and
  (f) positioning a single spring element between an outer race of the fore bearing and an inwardly extending shoulder of the bearing support structure to set a desired preload.

27. The method according to claim 26 including forming the single spring element as a machined spring.

28. The method according to claim 27 including installing an aft shim between the inwardly extending shoulder of the bearing support structure and an aft spring end of the machined spring, and installing a fore shim between another inwardly extending shoulder of the bearing support structure and a fore spring end of the machined spring.

29. The method according to claim 27 wherein the machined spring is formed by machining bar stock material into a thick-walled tube and cutting a plurality of slots in the tube to provide multiple beam elements that are deflectable to provide a desired spring stiffness.

30. The method according to claim 26 wherein the shaft comprises a fan shaft driven by a low pressure turbine and including installing inner races of the fore and aft bearings directly on the fan shaft.

31. The method according to claim 26 wherein the fore bearing comprises a single fore bearing and the aft bearing comprising a single aft bearing.

* * * * *